(12) United States Patent
Saito et al.

(10) Patent No.: US 12,111,493 B2
(45) Date of Patent: Oct. 8, 2024

(54) OPTICAL CONNECTION STRUCTURE AND METHOD FOR MANUFACTURING THE SAME

(71) Applicant: Nippon Telegraph and Telephone Corporation, Tokyo (JP)

(72) Inventors: Yohei Saito, Tokyo (JP); Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 185 days.

(21) Appl. No.: 17/630,042

(22) PCT Filed: Aug. 16, 2019

(86) PCT No.: PCT/JP2019/032141
§ 371 (c)(1),
(2) Date: Jan. 25, 2022

(87) PCT Pub. No.: WO2021/033217
PCT Pub. Date: Feb. 25, 2021

(65) Prior Publication Data
US 2022/0276436 A1 Sep. 1, 2022

(51) Int. Cl.
*G02B 6/42* (2006.01)
*G02B 6/122* (2006.01)

(52) U.S. Cl.
CPC .......... *G02B 6/1221* (2013.01); *G02B 6/4212* (2013.01)

(58) Field of Classification Search
CPC .................................... G02B 6/4212
See application file for complete search history.

(56) References Cited

U.S. PATENT DOCUMENTS

| | | | | |
|---|---|---|---|---|
| 9,972,961 | B2 * | 5/2018 | Sipes, Jr. | ............ H01S 3/06758 |
| 2016/0072585 | A1 | 3/2016 | Halderman et al. | |
| 2020/0110276 | A1 * | 4/2020 | Muendel | ............ G02B 6/02052 |
| 2021/0364700 | A1 * | 11/2021 | Liberale | ............... G02B 6/0046 |

FOREIGN PATENT DOCUMENTS

| | | | |
|---|---|---|---|
| JP | 2003131063 A | 5/2003 | |
| JP | 2004126306 A | 4/2004 | |
| JP | 2004177802 A | 6/2004 | |
| JP | 2007127878 A | 5/2007 | |
| JP | 2007206309 A | 8/2007 | |
| JP | 2016035549 A | 3/2016 | |
| WO | WO-2005040052 A2 * | 5/2005 | ............... G02B 6/12 |

OTHER PUBLICATIONS

Ito, M., "Optical Fiber for Low Loss Coupling with Silicon Photonics Device," Fujikura News, No. 438, 2018, 9 pages.

* cited by examiner

*Primary Examiner* — Chris H Chu
(74) *Attorney, Agent, or Firm* — Slater Matsil, LLP

(57) ABSTRACT

A first optical waveguide, a second optical waveguide, a connection optical waveguide including a resin core that optically connects the first optical waveguide and the second optical waveguide are included. The resin core is covered with cladding. The second optical waveguide has a core with a diameter that is different from a diameter of a core of the first optical waveguide. The resin core is disposed between an end surface of the first optical waveguide and an end surface of the second optical waveguide and optically connects the first optical waveguide and the second optical waveguide. Moreover, the resin core is configured with a cured photo-curable resin.

15 Claims, 11 Drawing Sheets

OPTICAL CONNECTION STRUCTURE AND METHOD FOR MANUFACTURING THE SAME

This patent application is a national phase filing under section 371 of PCT application no. PCT/JP2019/032141, filed on Aug. 16, 2019, which application is hereby incorporated herein by reference.

TECHNICAL FIELD

The present disclosure relates to an optical connection structure and a method of manufacturing the same.

BACKGROUND

With the development of optical communication networks, there is demand for improvement in degree of integration of optical communication devices and reduction in the size of optical devices. In the related art, planar lightwave circuits (PLCs) composed of quartz glass with a glass core are widely used in optical circuits used as optical communication devices. A PLC provides excellent coupling with optical fibers and high reliability as a material and is thus applied to a wide variety of functional elements for optical communication such as splitters, wavelength multiplexers/demultiplexers, optical switches, and polarization control elements.

In recent years, in order to deal with the aforementioned size reduction of optical circuits, research on an optical circuit having a high refractive index difference that is designed to reduce a minimum bending diameter by increasing a refractive index of a core and increasing the refractive index difference from that of the cladding has advanced. Also, in recent years, a silicon photonics technique using a core composed of silicon having a property of strong light confinement has progressed, and an optical circuit smaller than that of a glass type has been achieved. Silicon photonics techniques have attracted attention because they have a number of advantages such as being able to divert a mature manufacturing infrastructure of semiconductor devices such as metal-oxide-semiconductor field-effect transistors (MOSFETs).

On the other hand, silicon photonics has a serious problem in a high connection loss with ordinary optical fibers due to its core diameter that is as significantly small as about ¹⁄₁₀ the core diameter of optical fibers of the related art. In a case where a butt coupling which is used for connection between a PLC and an optical fiber and in which incident/emitting ends of each of the PLC and the optical fiber are caused to abut each other directly, for example, a connection loss of equal to or greater than 10 dB simply occurs.

In general, the connection loss in the case of butt coupling occurs because mode field diameters at incident/emitting end surfaces (connection end surfaces) to be connected are different from each other. In order to reduce the connection loss, it is important to cause the mode field diameters to coincide with each other at the connection end surfaces. To do so, a smaller mode field diameter is enlarged in accordance with a larger mode field diameter, for example.

For example, a tapered structure or the like that causes a mode field diameter to be enlarged by causing the core diameter of the optical waveguide to gradually change in the silicon photonics is used as a spot size conversion structure that causes the mode field diameter to be gradually enlarged in accordance with the optical fiber. Utilization of such a spot size conversion structure enables a connection with a low loss between a general-purpose single-mode fiber (conventional single-mode fiber: CSMF) and an optical waveguide of silicon photonics.

However, in order to achieve the enlargement from the mode field diameter in the silicon photonics to the mode field diameter of the single-mode fiber with a low loss, there is the major problem of high processing precision in the process being required.

Thus, a method of establishing low-loss connection therebetween by setting the mode field diameters on both the side of the silicon photonics and the side of the optical fiber to about 4 μm is currently often used. This allows the processing precision that enables connection with a low loss on the side of the silicon photonics to be relaxed.

Also, an optical fiber having a thermally diffused expanded core (TEC) has been used for relay in order to set the mode field diameter on the side of the optical fiber to about 4 μm (see NPL 1). An optical fiber having a TEC (TEC fiber) is an optical fiber in which the core can be enlarged through thermal diffusion. A TEC fiber with a core diameter of about 4 μm is used to establish connection to the silicon photonics with a low loss, and on the other hand, the core of the side connecting to the single-mode fiber is thermally diffused to achieve a loss of connection to the single-mode fiber. According to the technique, it is possible to reduce the loss of optical connection between the silicon photonics and the single-mode fiber to about 0.1 dB depending on conditions.

CITATION LIST

Non Patent Literature

NPL 1: "Research and Development, Optical Fiber for Low-loss Coupling with Silicon Photonics Devices", Fujikura News 2018 1, No. 438, 2018.

SUMMARY

Technical Problem

However, the aforementioned technique using a TEC fiber has a problem of high connection costs. For example, a fusion splicer that is different from a fusion splicer used for fusion splice of an ordinary single-mode fiber is required for TEC fusion splice between the TEC fiber and the single-mode fiber, and the fusion splicer is significantly expensive. Moreover, it is necessary to take time to promote thermal diffusion of the core in order to perform the TEC fusion splice with a low loss. The time required for the connection increases, for example, the time required for the TEC fusion splice is several tens of seconds, while the time required for ordinary fusion splice is several seconds, and as a result, the technique using the TEC fiber has a problem of productivity being degraded. As described above, connection between optical fibers with different mode field diameters with a low loss has a problem of an increase in cost.

Embodiments of the present disclosure can solve such problems, and an object thereof is to connect optical fibers with different mode field diameters with a low loss without increasing cost.

Means for Solving the Problem

An optical connection structure according to embodiments of the disclosure includes a first optical waveguide, a second optical waveguide whose end surface is disposed to face an end surface of the first optical waveguide, the second optical waveguide having a core diameter different from a core diameter of the first optical waveguide, and a connection optical waveguide that is disposed between the end surface of the first optical waveguide and the end surface of the second optical waveguide to optically connect the first optical waveguide to the second optical waveguide, the connection optical waveguide including a resin core made of a photo-curable resin that is cured, in which a core diameter of the resin core gradually changes from a state adapted to the core diameter of the first optical waveguide to a state adapted to the core diameter of the second optical waveguide from a side facing the first optical waveguide to a side facing the second optical waveguide.

Also, a method of manufacturing an optical connection structure according to embodiments of the disclosure is a method of manufacturing the aforementioned optical connection structure including disposing the first optical waveguide and the second optical waveguide in such a manner that the end surface of the first optical waveguide and the end surface of the second optical waveguide face each other, disposing the photo-curable resin between the end surface of the first optical waveguide and the end surface of the second optical waveguide, and forming the resin core by guiding a curing light that performs photo-curing of the photo-curable resin through each of the first optical waveguide and the second optical waveguide to perform, with the curing light, the photo-curing of the photo-curable resin disposed between the end surface of the first optical waveguide and the end surface of the second optical waveguide.

Effects of Embodiments of the Invention

As described above, according to embodiments of the disclosure, the connection optical waveguide including the resin core made of the cured photo-curable resin is provided between the end surface of the first optical waveguide and the end surface of the second optical waveguide to optically connect the first optical waveguide to the second optical waveguide, and it is thus possible to connect optical fibers with different mode field diameters with a low loss without increasing cost.

DETAILED DESCRIPTION OF ILLUSTRATIVE EMBODIMENTS

Hereinafter, an optical connection structure according to embodiments of the disclosure will be described.

First Embodiment

Figure 1:
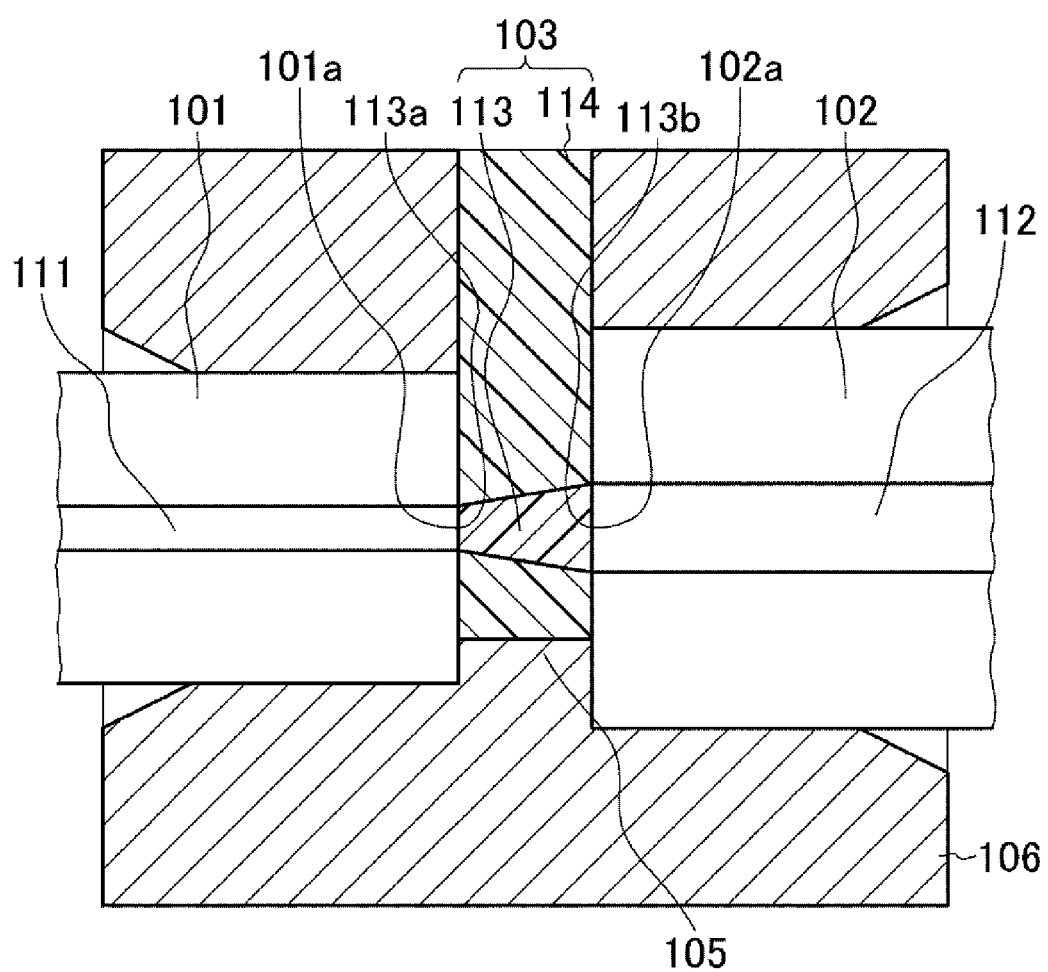
FIG. 1 is a sectional view illustrating a configuration of an optical connection structure according to a first embodiment of the disclosure.

First, the optical connection structure according to a first embodiment of the disclosure will be described with reference to FIG. 1. The optical connection structure includes a first optical waveguide 101, a second optical waveguide 102, and a connection optical waveguide 103 including a resin core 113 that optically connects the first optical waveguide 101 and the second optical waveguide 102. The resin core 113 is covered with cladding 114. The first optical waveguide 101 is, for example, a TEC fiber. The second optical waveguide 102 is a general-purpose single-mode fiber.

The second optical waveguide 102 has a core 112 with a diameter that is different from a diameter of a core 111 of the first optical waveguide 101. In this example, the diameter of the core 112 is larger than the diameter of the core 111 in a sectional view. Also, an end surface 101a of the first optical waveguide 101 and an end surface 101a of the second optical waveguide 102 are disposed to face each other. For example, the end surface 101a and the end surface 102a are balanced with each other.

Also, the resin core 113 is disposed between the end surface 101a of the first optical waveguide 101 and the end surface 102a of the second optical waveguide 102 to optically connect the first optical waveguide 101 and the second optical waveguide 102. Moreover, the resin core 113 is configured with a cured photo-curable resin.

In addition, an end surface ma of the resin core 113 facing the first optical waveguide 101 and the end surface 101a of the core 111 of the first optical waveguide 101 abut each other. Also, an end surface 113b of the resin core 113 facing the second optical waveguide 102 and the end surface 102a of the core 112 of the second optical waveguide 102 abut each other. Here, it is possible to obtain a configuration in which the end surface of the first optical waveguide 101 and the end surface of the second optical waveguide 102 are adhesively secured with the cladding 114 by configuring the cladding 114 using a resin with adhesiveness, for example.

Moreover, in the optical connection structure according to the first embodiment, the core diameter of the resin core 113 gradually changes from a state adapted to the core diameter of the first optical waveguide 101 to a state adapted to the core diameter of the second optical waveguide 102 from the side facing the first optical waveguide 101 to the side facing the second optical waveguide 102. Here, "adapted" means an optically adapted state and indicates a state where a difference in core diameters of the cores, the end surfaces of which abut each other, falls within a range in which a connection loss of optical coupling between the optical waveguides achieved by the cores is equal to or less than a set desired value. For example, the core diameter of the side of the resin core 113 facing the first optical waveguide 101 is substantially the same as the core system of the first optical waveguide 101 (core 111). Also, the core diameter of the side of the resin core 113 facing the second optical waveguide 102 is substantially the same as the core system of the second optical waveguide 102 (core 112).

Here, the optical connection structure according to the first embodiment includes a spacer 105 that is disposed between the end surface of the first optical waveguide 101 and the end surface of the second optical waveguide 102 to define an interval (clearance) between the end surface of the first optical waveguide 101 and the end surface of the second optical waveguide 102. Also, the optical connection structure includes a holding member 106 that secures the first optical waveguide 101 and the second optical waveguide 102. The holding member 106 includes an insertion portion (capillary) into which the first optical waveguide 101 and the second optical waveguide 102 are to be inserted, and the spacer 105 is included at the center of the insertion portion.

The optical connection structure according to the first embodiment optically connects the first optical waveguide 101 and the second optical waveguide 102 with different mode field diameters with a low loss by gradually transforming the mode field diameters using the resin core 113 with a core diameter gradually changing from the side facing the first optical waveguide 101 to the side facing the second optical waveguide 102. Also, the optical connection structure according to the first embodiment can keep the interval between the first optical waveguide 101 and the second optical waveguide 102 constant using the spacer 105.

Next, a method of manufacturing the optical connection structure according to the first embodiment will be described. First, the first optical waveguide 101 and the second optical waveguide 102 that are to be connected are cut using a fiber cleaver to expose the end surface 101a and the end surface 101a. Next, the first optical waveguide 101 and the second optical waveguide 102 are inserted into the insertion portion of the holding member 106, and the end surface 101a and the end surface 101a are caused to abut the spacer 105. Here, a structure with a hole diameter gradually decreasing toward the spacer 105 is provided to the insertion portion of the holding member 106 with a circular shape in a sectional view, and this leads to easiness of insertion of the first optical waveguide 101 and the second optical waveguide 102 and thus an improvement in efficiency of the operation.

Here, the interval between the first optical waveguide 101 and the second optical waveguide 102 is important for the optical connection structure for the following reasons, and it is thus important to appropriately set the interval therebetween. In general, the connection optical waveguide 103 is required to change slightly in a light propagation direction, which is considered to be important in regard to how the mode field diameters can be transformed with a low loss using the resin core 113 with a tapered structure with a diameter gradually changing, in order to prevent the light propagating through the resin core 113 from being lost due to reflection or occurrence of much radiation from the waveguides.

In a tapered structure, for example, when an angle of a change in structure in the propagation direction is not shallow with respect to the light propagation direction, a loss due to transformation using the tapered structure occurs. It is thus necessary to appropriately set a taper angle, and the taper angle is basically determined by core diameters at both ends of the tapered structure, the length of the taper, and refractive indexes of the cladding and the cores.

Incidentally, the core diameter of the side of the resin core 113 facing the first optical waveguide 101 does not completely coincide with the core system of the core 111, and the resin core 113 has a slightly larger diameter than that of the core 111, according to the manufacturing method, which will be described below. Similarly, the core diameter of the side of the resin core 113 facing the second optical waveguide 102 does not completely coincide with the core system of the core 112, and the resin core 113 has a slightly larger diameter than that of the core 112. In other words, the core diameters of these cores are substantially the same. Thus, the taper angle of the tapered structure of the resin core 113 is substantially determined by the interval between the first optical waveguide 101 and the second optical waveguide 102.

Also, although it is possible to change the taper angle to some extent by the refractive indexes of the cladding and the cores, it is not easy to significantly change the refractive index of the cladding 114 in a case in which the cladding 114 is configured with an adhesive as will be described below. Further, it is also not easy to significantly change the refractive index of the resin core 113 configured with the photo-curable resin. On the basis of these facts, the taper angle that determines the loss of the resin core 113 with the tapered structure is preferably controlled by the interval between the first optical waveguide 101 and the second optical waveguide 102.

Figure 2:
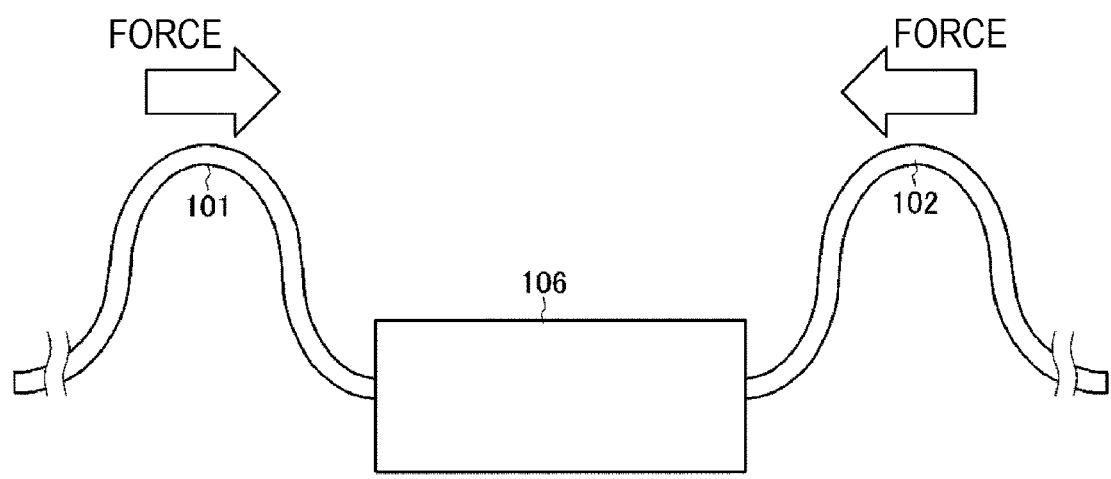
FIG. 2 is a configuration diagram illustrating a partial configuration of the optical connection structure according to the first embodiment of the disclosure.

On the basis of the above description, the spacer 105 is provided to define the interval between the end surface of the first optical waveguide 101 and the end surface of the second optical waveguide 102. Also, it is important to reliably cause the end surface of the first optical waveguide 101 and the end surface of the second optical waveguide 102 to abut the spacer 105. To do so, each of the first optical waveguide 101 and the second optical waveguide 102 is inserted into the insertion portion of the holding member 106 while a force is applied in a waveguide direction of the optical fiber to such an extent that each of the first optical waveguide 101 and the second optical waveguide 102 buckles as illustrated in FIG. 2.

Also, presence of foreign matter in the insertion portion of the holding member 106 may serve as an obstacle when the interval between the first optical waveguide 101 and the second optical waveguide 102 is accurately set. It is thus desirable that the insertion portion of the holding member 106 be washed such that it is clean and the insertion operation be carried out in an environment with reduced dust, such as a clean room. Note that as a structure for maintaining the interval between the first optical waveguide 101 and the second optical waveguide 102 and facilitating disposition of the optical fibers, a spacer may be provided in a V-groove used when a fiber array is produced, for example, and be caused to serve as the holding member. It is only necessary for the holding member to have a configuration with which the first optical waveguide 101 and the second optical waveguide 102 can be secured with the interval therebetween accurately set.

Figure 3:
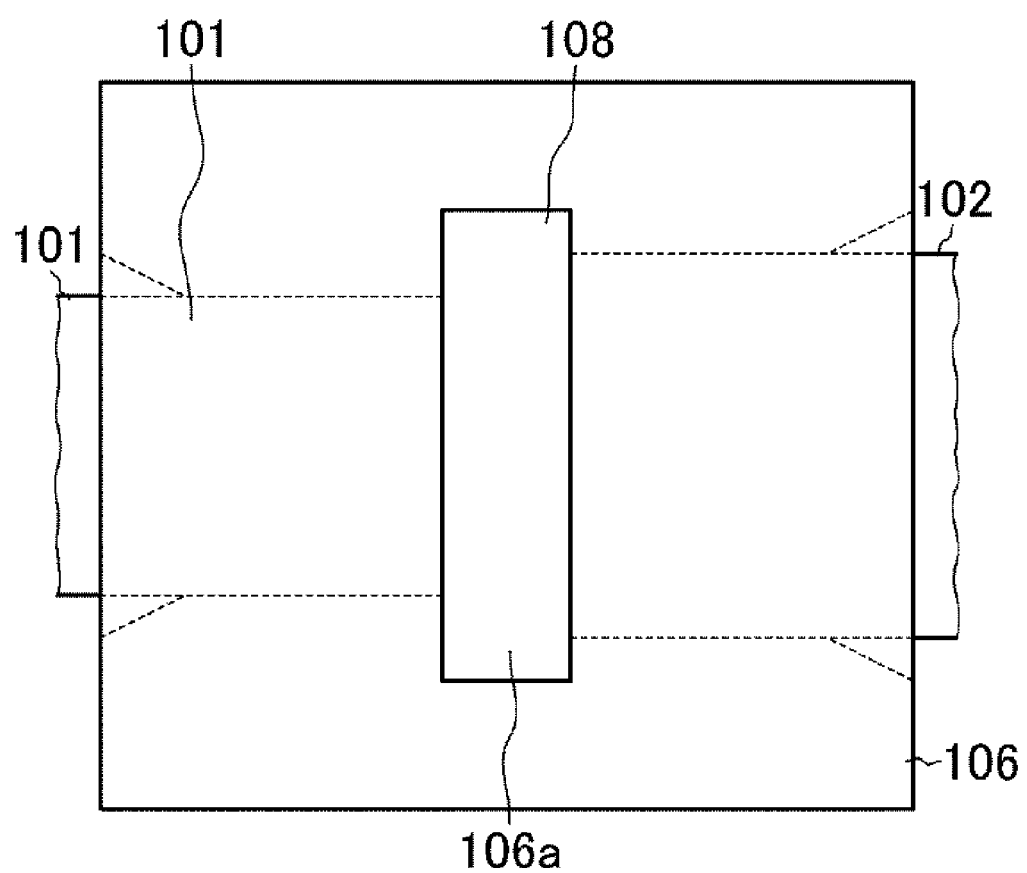
FIG. 3 is a plan view illustrating a partial configuration of the optical connection structure according to the first embodiment of the disclosure.

As described above, the first optical waveguide 101 and the second optical waveguide 102 are secured at a predetermined interval from each other and are disposed such that the end surfaces thereof face each other (the disposing the first optical waveguide and the second optical waveguide), and the photo-curable resin for forming the resin core 113 is then disposed therebetween (the disposing the photo-curable resin). As illustrated in FIG. 3, for example, the photo-curable resin 108 is disposed between the end surface of the first optical waveguide 101 and the end surface of the second optical waveguide 102 by pouring the photo-curable resin through an opening 106a of the holding member 106.

Figure 4:
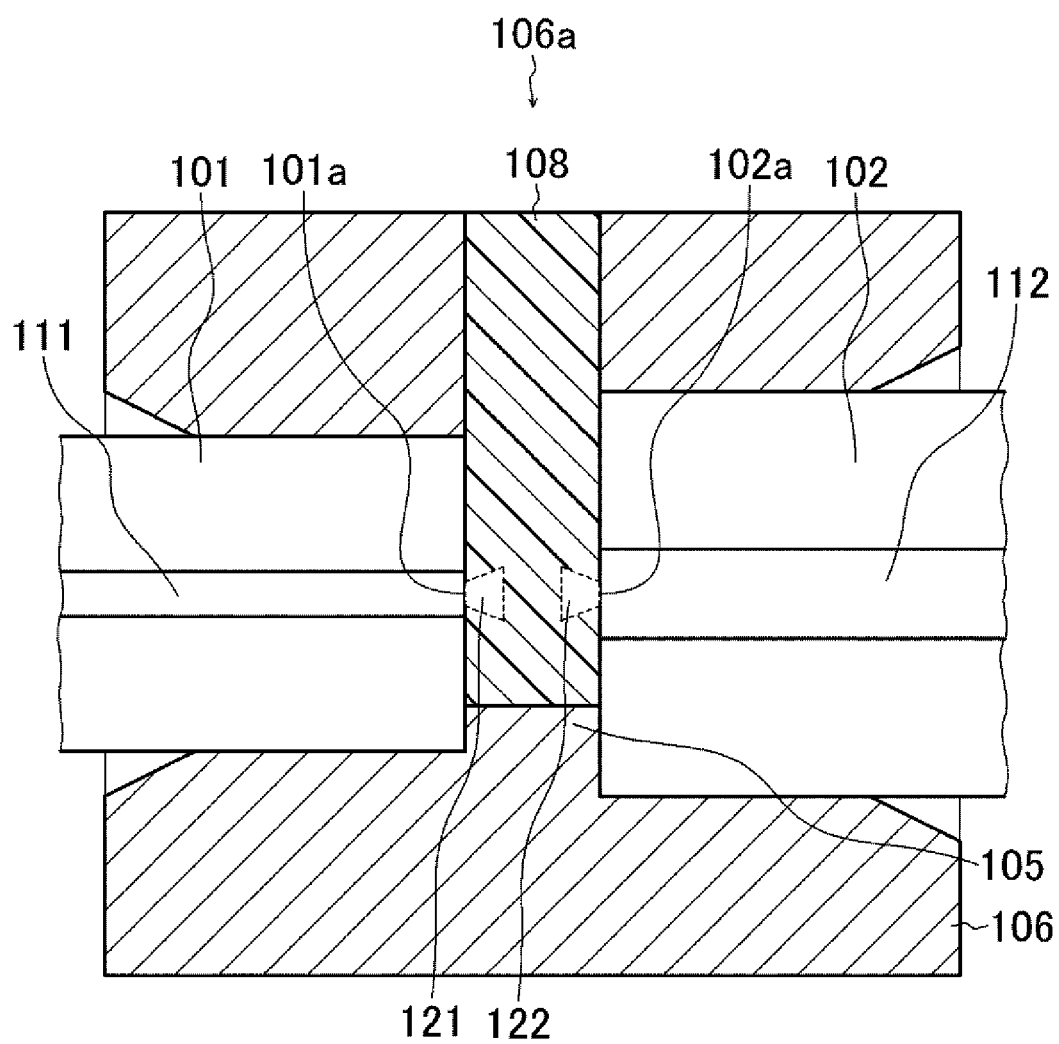
FIG. 4 is a sectional view illustrating a configuration in a process of manufacturing the optical connection structure according to the first embodiment of the disclosure.

Next, curing light with which the photo-curable resin 108 is photo-cured is guided to each of the first optical waveguide 101 and the second optical waveguide 102, and the photo-curable resin 108 disposed between the end surface of the first optical waveguide 101 and the end surface of the second optical waveguide 102 is irradiated with the curing light 121 and the curing light 122 as illustrated in FIG. 4, thereby the photo-curable resin 108 being photo-cured at the irradiated location (the forming the resin core).

The aforementioned irradiation with the curing light 121 and the curing light 122 is a process of forming a resin waveguide using the photo-curable resin, which is typically called a self-formed waveguide. In this process, the curing light 121 and the curing light 122 are basically substantially confined in the core diameters of the first optical waveguide 101 and the second optical waveguide 102, respectively. Thus, the beam diameters of the curing light 121 and the curing light 122 at the time of emission substantially coincide with the core diameters of the first optical waveguide 101 and the second optical waveguide 102, respectively. Also, the photo-curable resin starts to be hardened from a portion where a light intensity is high. The aforementioned resin core 113 with the tapered shape is thus formed by performing irradiation with the curing light 121 and the curing light 122 from between the first optical waveguide 101 and the second optical waveguide 102 with different core diameters.

Incidentally, a shape of the aforementioned resin core 113 formed through self-formation gradually changes unless the irradiation with the curing light 121 and the curing light 122 is stopped. Here, a transformation loss of the mode field diameters changes depending on the taper angle and the like as described above, and there is an optimal shape of the resin core 113 in order to achieve a low transformation loss. Thus, there is an optimal irradiation time (exposure time) with the curing light 121 and the curing light 122 for producing the aforementioned resin core 113 through self-formation.

Figure 5A:
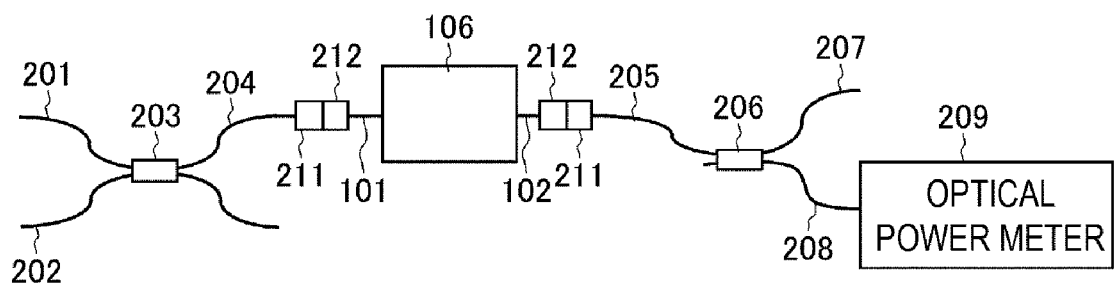
FIG. 5A is a configuration diagram illustrating a configuration in a process of manufacturing the optical connection structure according to the first embodiment of the disclosure.

In order to set the aforementioned appropriate irradiation time for the curing light 121 and the curing light 122, it is preferable to cause signal light in a wavelength band to which the optical connection structure is applied to be incident along with the curing light 121 or the curing light 122 and to perform irradiation with the curing light 121 or the curing light 122 while monitoring the signal light, for example. As illustrated in FIG. 5A, for example, the curing light 121 that is emitted from a light source (a semiconductor laser, for example), which is not illustrated, and is to be guided to an optical fiber 201 and signal light that is emitted from a light source (a semiconductor laser, for example), which is not illustrated, and is to be guided to an optical fiber 202 are multiplexed with a coupler 203, and the multiplexed light is introduced into the first optical waveguide 101 via an optical fiber 204. The signal light is assumed to be light with a wavelength that is not absorbed by an uncured photo-curable resin, in other words, light with a wavelength with which the photo-curable resin is not cured. On the other hand, the curing light 122 that is emitted from a light source (a semiconductor laser, for example), which is not illustrated, and is to be guided to an optical fiber 207 is introduced into the second optical waveguide 102 via a coupler 206 and an optical fiber 205.

Figure 5B:
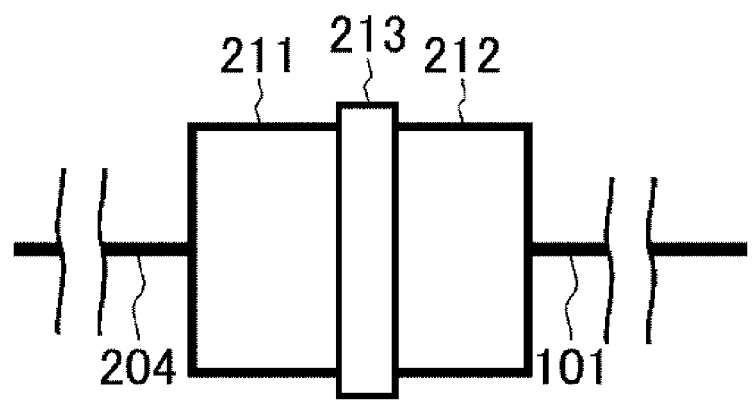
FIG. 5B is a configuration diagram illustrating a partial configuration in a process of manufacturing the optical connection structure according to the first embodiment of the disclosure.

Here, the optical fiber 204 and the first optical waveguide 101, and the optical fiber 205 and the second optical waveguide 102 are connected using a fiber connector 211 and a simple connector 212. These can be connected using a predetermined adapter 213 as illustrated in FIG. 5B, for example. The simple connector 212 is adapted such that the optical fiber can be inserted thereinto and can be pulled out therefrom and is used by the other end of the first optical waveguide 101 cut by a fiber cleaver being inserted into the simple connector 212, for example. In a case in which the simple connector 212 is used to establish connection to the fiber connector 211, there is a probability that a connection loss will occur. However, in a case in which a photo-curable resin that is cured in a visible light range is used, emission of light that is as significantly small as several µw from the optical waveguide end surface is sufficient to cure a region that is as significantly small as about several µm, and the aforementioned problem does not occur.

As described above, the curing light 121 and the curing light 122 are introduced into the first optical waveguide 101 and the second optical waveguide 102, and the photo-curable resin 108 is irradiated inside the holding member 106. In this process, the signal light introduced into the first optical waveguide 101 along with the curing light 121 guides, when the portions cured through irradiation with the aforementioned curing light 121 and the curing light 122 extend in both directions and are connected to each other, a connection optical waveguide that includes, as a core, these connected cured portions, guides the second optical waveguide 102, guides the optical fiber 205, passes through the coupler 206, and is then input to an optical power meter 209 via an optical fiber 208.

The intensity of the signal light input to the optical power meter 209 as described above is measured (monitored) with the optical power meter 209, and the photo-curable resin 108 is photo-cured after setting the aforementioned irradiation time of the curing light 121 and the curing light 122 such that the measured light intensity (transmission intensity) becomes a maximum. In this manner, the formed resin core 113 can have a tapered structure with a minimum (optimal) transformation loss.

Also, since the connection loss is only a relative value, it is thus possible to measure the light intensity even if the signal light has not sufficiently coupled between connection events, and it is thus sufficiently possible to produce the resin core 113 with an optimal connection loss with the system of light irradiation and signal light measurement described above using FIG. 5A. Also, the couplers required to produce the aforementioned resin core 113 and the semiconductor laser of a visible light band that emits curing light can be obtained at very low cost as compared with the fusion splicer. Particularly, the price of a blue semiconductor laser capable of curing more resin has significantly dropped in recent years, and it is possible to construct the aforementioned system for light irradiation and signal light measurement inexpensively and easily.

As described above, the photo-cured resin core 113 is formed in the photo-curable resin 108, and the uncured photo-curable resin 108 is then removed (the removing). For example, a solvent such as ethanol is introduced from the opening 106a of the holding member 106, the uncured photo-curable resin 108 is caused to flow out, and sufficient cleaning is then performed. Next, the cladding 114 in which the resin core 113 is embedded is formed between the end surface of the first optical waveguide 101 and the end surface of the second optical waveguide 102 (the forming the cladding).

For example, a cladding material with a refractive index equivalent to that of the uncured photo-curable resin is dropped between the end surface of the first optical waveguide 101 and the end surface of the second optical waveguide 102 and is then cured, thereby obtaining the cladding 114. As is well known, the refractive index of the photo-curable resin changes through photo-curing, and a difference in refractive indexes is formed between the uncured photo-curable resin and the cured photo-curable resin. It is possible to reproduce an optical property of the difference in refractive indexes between the resin core 113 and the cladding 114, which is similar to that in the aforementioned optimal state of the shape of the resin core 113 through the monitoring of the signal light, by using the aforementioned cladding material and to achieve connection with a low loss.

Note that it is desirable that the cladding material be a resin material that can be solidified through curing. Through the solidification, it is possible to curb the resin spilling out of the opening 106a and thus a change in optical properties due to the resin core 113. Also, it is more important to give the cladding resin a property of allowing sufficient adhesive securing. It is possible to obtain a configuration in which the end surface of the first optical waveguide 101 and the end surface of the second optical waveguide 102 are adhesively secured to each other, with the cladding 114 obtained by solidifying the cladding material.

If a buckling and holding jig or the like described above using FIG. 2 is removed after the cladding 114 is formed as described above, the optical connection structure according to the first embodiment is obtained.

Figure 6:
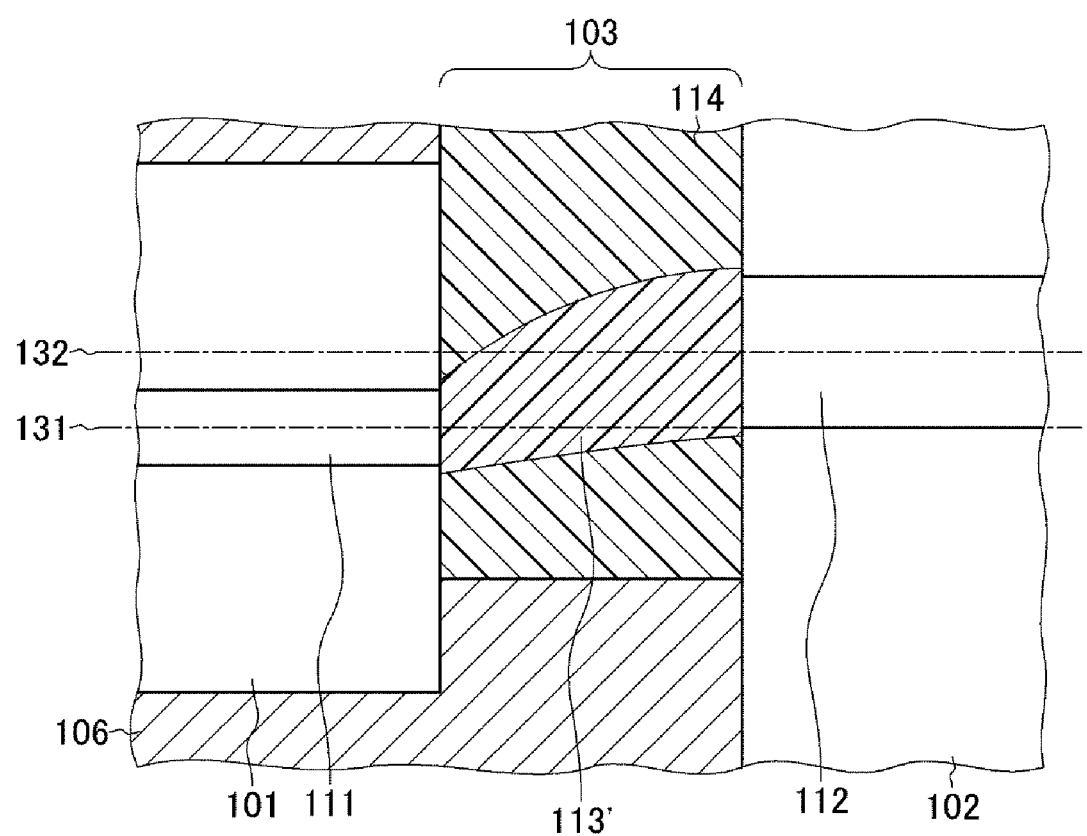
FIG. 6 is a sectional view illustrating a partial configuration of another optical connection structure according to the first embodiment of the disclosure.

Incidentally, the curing light is emitted from each of the end surfaces of the optical waveguides in the aforementioned manufacturing method, and it is thus possible to obtain a misalignment compensation effect through the self-formation waveguides. As illustrated in FIG. 6, for example, it is possible to compensate for a deviation of several μm even if a deviation occurs between an optical axis 131 of the first optical waveguide 101 and an optical axis 132 of the second optical waveguide 102 due to manufacturing tolerances of the holding member 106. As described above, a resin core 113' that connects the core 111 and the core 112 with the optical axis 131 and the optical axis 132 deviating from each other is formed with the curing light emitted from each of the first optical waveguide 101 and the second optical waveguide 102. As described above, the disclosure has an advantage that high working precision is not necessary for producing the holding member 106.

Next, properties of the optical connection structure that is actually produced will be described with reference to FIG. 7. The first optical waveguide 101 is a TEC fiber that can be TEC fusion spliced and has a mode field diameter of about 4 μm. Also, the second optical waveguide 102 is a general-purpose single-mode fiber. Moreover, the photo-curable resin for obtaining the resin core 113 is an acrylic resin and has a refractive index of about 1.5. The interval between the end surface 101a of the first optical waveguide 101 and the end surface 102a of the second optical waveguide 102 is 50 μm.

Figure 7:
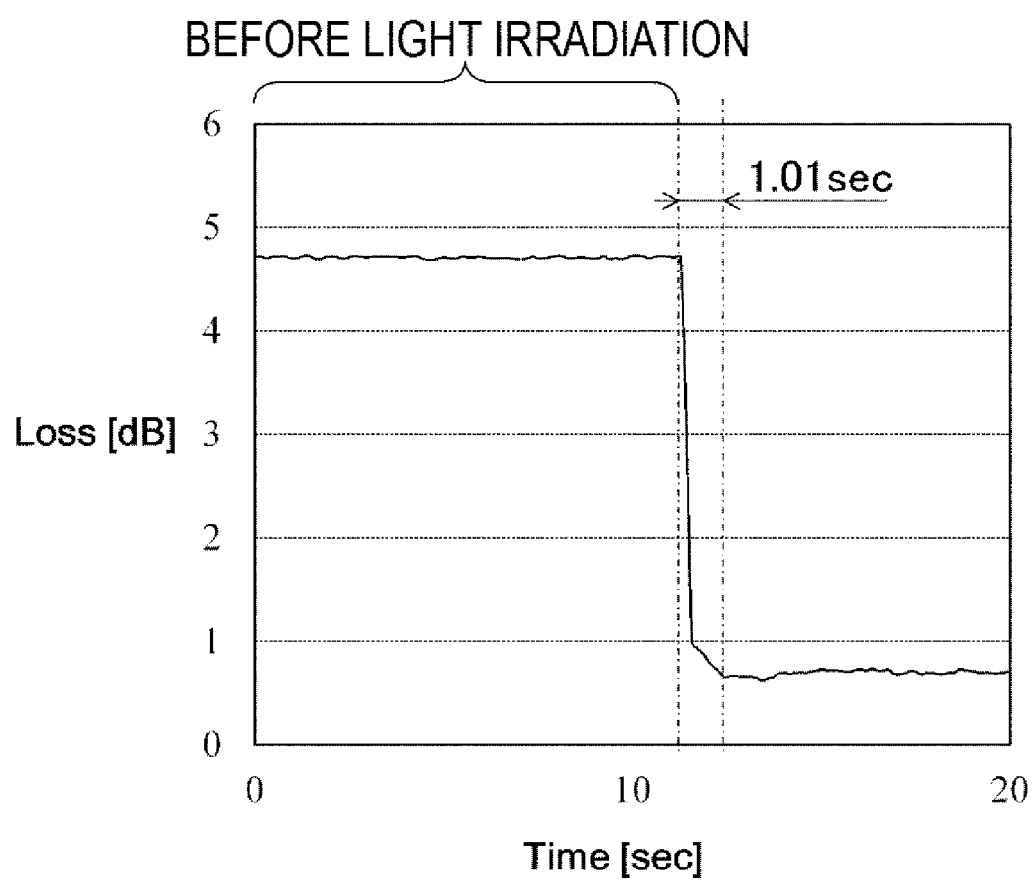
FIG. 7 is a characteristics diagram illustrating characteristics of an optical connection structure actually produced.

FIG. 7 illustrates transition of a connection loss monitored using signal light when the photo-curable resin is irradiated with the curing light. As illustrated in FIG. 7, photo-curing is achieved, the resin core 113 is obtained, and a predetermined connection loss is obtained at 1.01 seconds after the irradiation with the curing light. This time is significantly short as compared with the TEC fusion splice, and it is possible to ascertain that the production of the connection structure can be completed in a significantly short period of time as compared with the TEC fusion splice according to the manufacturing method. Also, the connection loss at this time is about 0.65 dB in a 1.55 μm band, which is substantially equivalent to a typically required connection loss, and it is possible to ascertain that a sufficient connection loss can be obtained in a short period of time.

Figure 8:
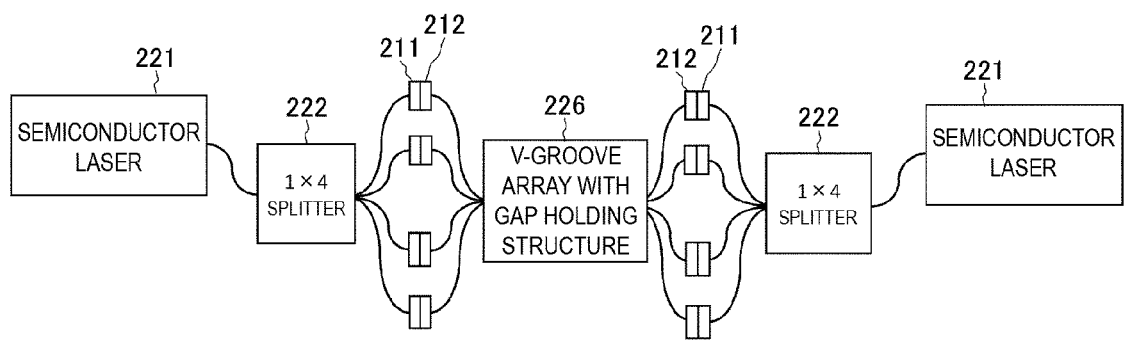
FIG. 8 is a configuration diagram illustrating a configuration in a process of manufacturing the optical connection structure according to the first embodiment of the disclosure in which a plurality of optical connection structures are produced at the same time.

Incidentally, it is possible to produce a plurality of optical connection structures at the same time using the system illustrated in FIG. 8. Curing light emitted by a semiconductor laser 221 is split into four with a 1×4 splitter 222 and is incident on a first optical waveguide and a second optical waveguide of each of four optical connection structures held by a V-groove array with gap holding structure 226. A fiber connector 211 and a simple connector 212 can be used for connection between each first optical waveguide and each second optical waveguide similarly to the above description. In this manner, it is possible to produce a plurality of optical connection structures at the same time by securing the first optical waveguides and the second optical waveguides of the four sets with the V-groove array with gap holding structure 226 provided with four V-grooves, each of which has a spacer.

Also, in a case in which the plurality of optical connection structures are produced at the same time in this manner, it is only necessary to obtain optimal conditions in advance in regard to an irradiation time, irradiation intensity, and the like, for example, and to produce the optical connection structures under the conditions. Moreover, it is also possible to produce the optical connection structures by combining the system for monitoring signal light as described above using FIG. 5A with the first optical waveguides and the second optical waveguides of the plurality of sets to be secured to the V-groove array with gap holding structure and monitoring the intensity of signal light.

Second Embodiment

Next, an optical connection structure according to a second embodiment of the disclosure will be described with reference to FIGS. 9 and 10. The optical connection structure includes fiber connectors (holding member) 306 that individually hold each of a first optical waveguide and a second optical waveguide (not illustrated). Optical fibers are held in a fiber area 301 penetrating through the fiber connectors 306. Connection surfaces 306a of the two fiber connectors 306 are caused to face each other, and a film 305 is disposed therebetween as a spacer. The fiber connectors 306 can be multi-fiber push-on (MPO) connectors capable of holding a plurality of optical fibers in the fiber area 301.

The first optical waveguide and the second optical waveguide are inserted into and secured to the two fiber connectors 306 such that the same plane as the connection surface 306a is formed by the end surface of each of the first optical waveguide and the second optical waveguide cut using a fiber cleaver. Thereafter, the film 305 is pinched as a spacer, the connection surfaces 306a of the two fiber connectors 306 are caused to face each other, and a photo-curable resin 308 is disposed therebetween. It is possible to adjust the interval between the end surface of the first optical waveguide and the end surface of the second optical waveguide by adjusting the thickness of the film 305 (see Reference Literature 1).

Positioning (alignment) between an optical axis of the first optical waveguide and an optical axis of the second optical waveguide is performed on the basis of a relative position of each fiber connector 306. In general, the interval between the end surfaces of the optical fibers is eliminated, and optical connection is established therebetween, by applying a pressing force to each of the optical fibers to be connected using a mechanical mechanism in the optical connection using the fiber connectors 306.

On the other hand, in a case in which a predetermined clearance is provided between the end surfaces of the two optical fibers to be connected, the film 305 is disposed between the connection surfaces 306a of the two fiber connectors 306. For example, the film 305 is attached to the connection surface 306a of one of the fiber connectors 306, and the connection surfaces 306a of the two fiber connectors 306 are caused to face each other. In this manner, a fixed clearance is maintained by the film 305 to secure the first optical waveguide to the second optical waveguide.

Here, if the connection surfaces 306a of the two fiber connectors 306 are caused to face each other and a force (mating force) necessary to connect the first optical waveguide and the second optical waveguide is applied therebetween, the film 305 configured with the resin is deformed (elastically deformed). The shape including the thickness of the film 305 is determined in consideration of such deformation of the film 305 due to the mating force.

Figure 9:
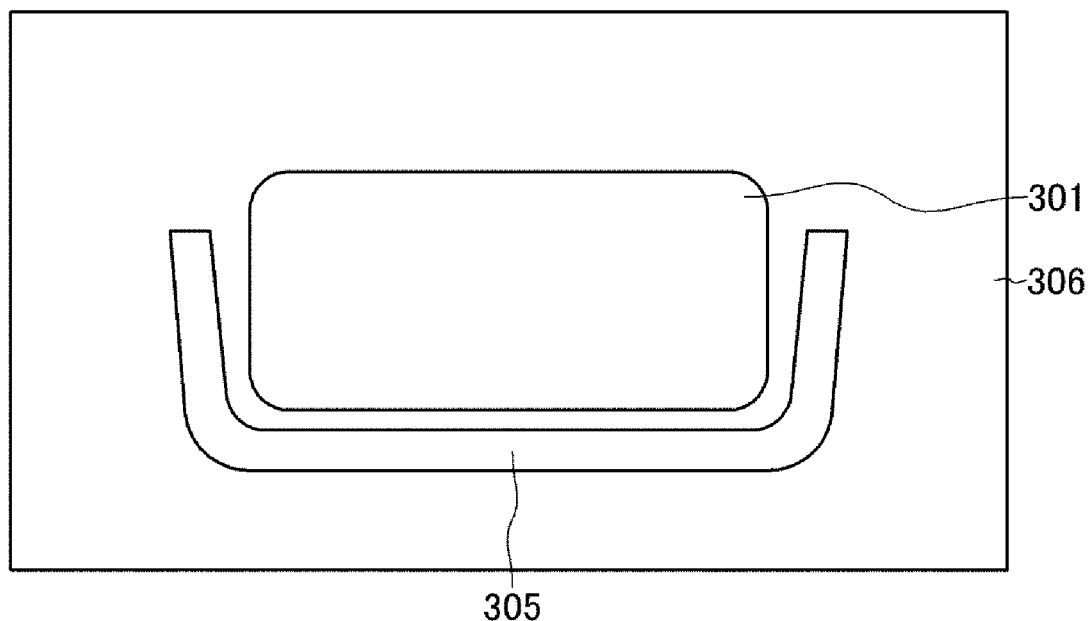
FIG. 9 is a plan view illustrating a partial configuration of an optical connection structure according to a second embodiment of the disclosure.
Figure 10:
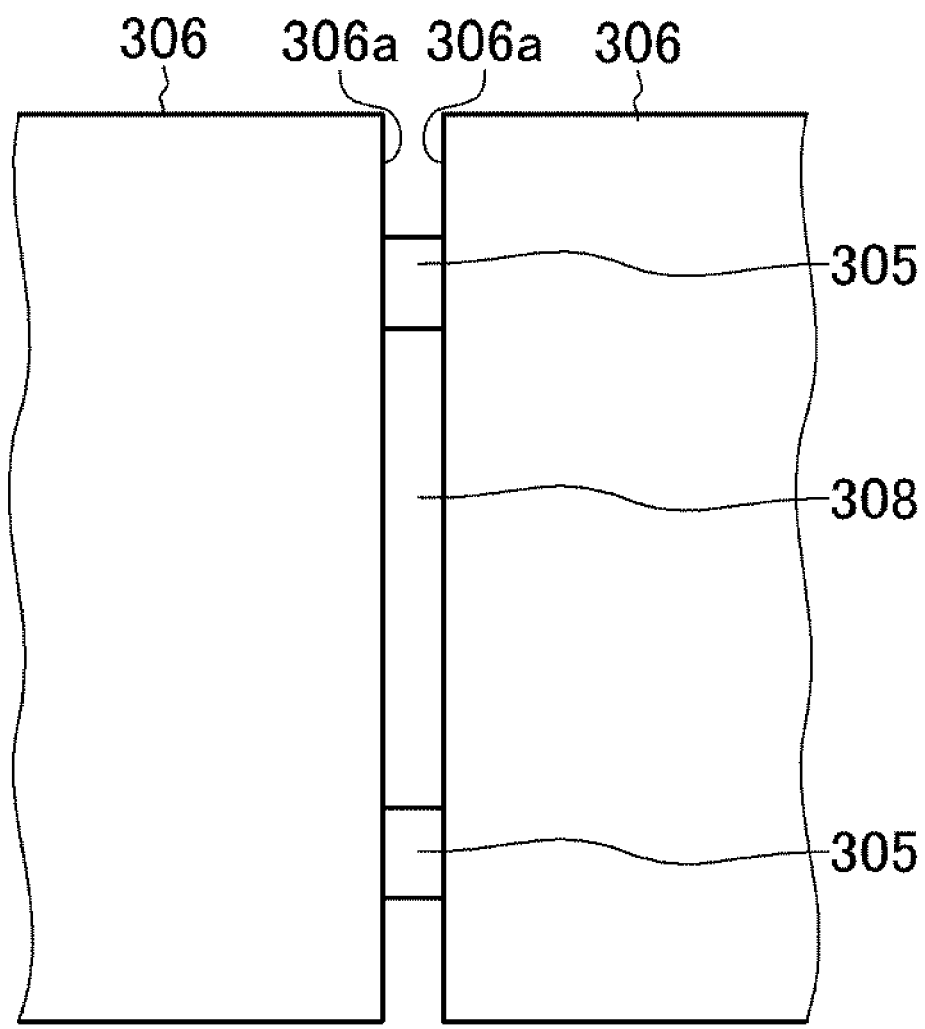
FIG. 10 is a top view illustrating a partial configuration of the optical connection structure according to the second embodiment of the disclosure.

Incidentally, because the uncured photo-curable resin 308 is in a liquid form, the film 305 is made into a U shape, an arc shape, or the like in a plan view as illustrated in FIG. 9, so that a state in which a container is configured with the connection surfaces 306a of the two fiber connectors 306 and the film 305 is obtained. Note that it is assumed that optical fibers are held in the fiber area 301. The state in which the photo-curable resin 308 is disposed between the connection surfaces 306a of the two fiber connectors 306 can be maintained with the container obtained by the film 305.

In this state, the resin core can be formed through irradiation with curing light from each of the first optical waveguide and the second optical waveguide. Also, the uncured photo-curable resin 308 is washed out and removed after the resin core is formed. Thereafter, a resin that serves as cladding and for achieving securing is supplied and cured, thereby obtaining an optical connection structure in which the first optical waveguide and the second optical waveguide are optically connected with the connection optical waveguide including the resin core similarly to the aforementioned first embodiment.

Figure 11A:
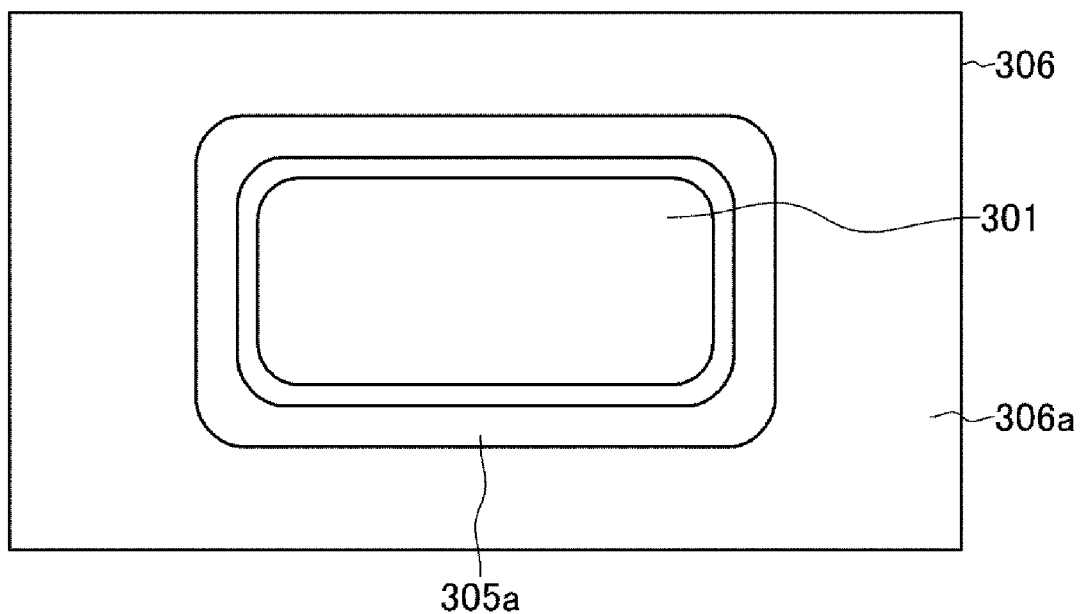
FIG. 11A is a plan view illustrating a partial configuration of the optical connection structure according to the second embodiment of the disclosure.
Figure 11B:
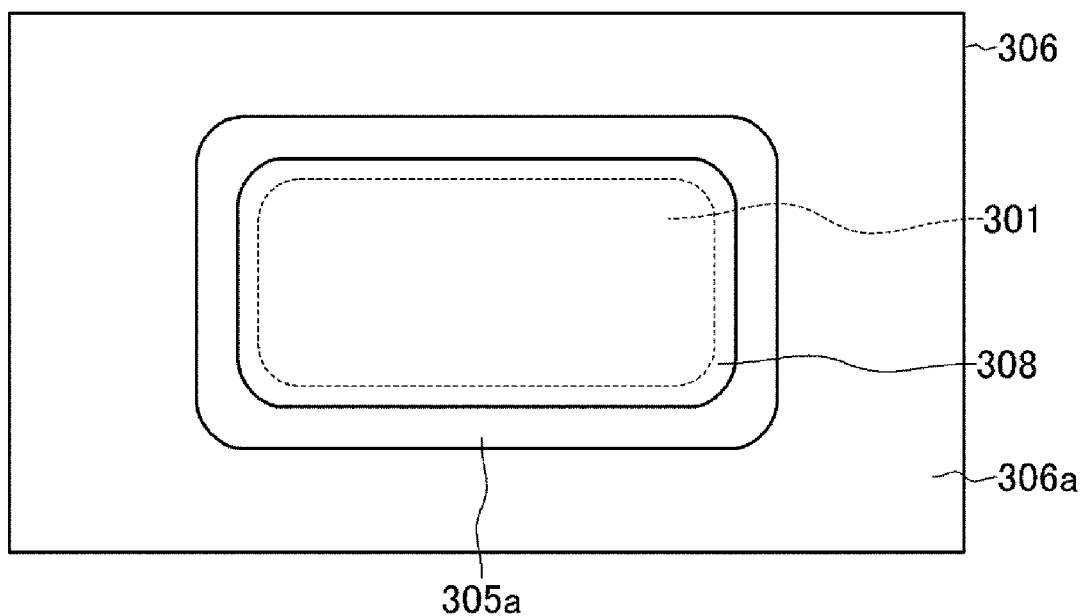
FIG. 11B is a plan view illustrating a partial configuration of the optical connection structure according to the second embodiment of the disclosure.

Incidentally, the cladding can also be used in the liquid form. For example, it is possible to use the uncured photo-curable resin 308 as the cladding. As illustrated in FIG. 11A, for example, an annular film 305a is attached to the connection surface 306a of the fiber connector 306 in a state in which the film 305a surrounds the periphery of the fiber area 301 where the optical fibers are accommodated. In this state, the photo-curable resin 308 is accommodated (poured) inside the annular film 305a attached to the connection surface 306a, and the connection surface 306a of the other fiber connector 306 is caused to abut as illustrated in FIG. 11B. In this manner, the tightly closed container is configured with the connection surfaces 306a of the two fiber connectors 306 and the film 305a.

The resin core is formed through irradiation with curing light from each of the first optical waveguide and the second optical waveguide, and a state in which the cladding obtained from the uncured photo-curable resin 308 is disposed in the surroundings of the resin core is achieved.

As described above, according to embodiments of the disclosure, the connection optical waveguide including the resin core made of the cured photo-curable resin is provided between the end surface of the first optical waveguide and the end surface of the second optical waveguide to optically connect the first optical waveguide to the second optical waveguide, and it is thus possible to connect the optical fibers with different mode field diameters with a low loss without increasing cost.

Note that the disclosure is not limited to the embodiments described above, and it is obvious that those skilled in the art can implement a large number of modifications and combinations within the technical idea of the disclosure. For example, there are no limitations in the core diameter of the first optical waveguide and the core diameter of the second optical waveguide. Also, the first optical waveguide and the second optical waveguide can also be planar optical wave circuit waveguides or multi-core fibers.

[Reference Literature 1] Hajime Arao et al, "FlexAirConnecT: Dust Insensitive Multi-Fiber Connector with Low Loss and Low Mating Force", Information Communication, SEI Technical Review, July, No. 193, p.p. 26 to 31, 2018.

REFERENCE SIGNS LIST

101 First optical waveguide
101a End surface
102 Second optical waveguide
102a End surface
103 Connection optical waveguide
105 Spacer
106 Holding member
111 Core
112 Core
113 Resin core
113a End surface
113b End surface
114 Cladding

The invention claimed is:

1. An optical connection structure comprising:
a first optical waveguide;
a second optical waveguide having an end surface disposed to face an end surface of the first optical waveguide, and the second optical waveguide having a core diameter different from a core diameter of the first optical waveguide;
a holding member configured to secure the first optical waveguide and the second optical waveguide, wherein the holding member comprises an insertion portion into which the first optical waveguide and the second optical waveguide are to be inserted;
a spacer comprising a film disposed at a center of the insertion portion between the end surface of the first optical waveguide and the end surface of the second optical waveguide to define an interval between the end surface of the first optical waveguide and the end surface of the second optical waveguide, wherein a bottom surface of the spacer is higher than a bottom surface of the first optical waveguide and a bottom surface of the second optical waveguide in a cross-sectional view; and a connection optical waveguide disposed between the end surface of the first optical waveguide and the end surface of the second optical waveguide to optically connect the first optical waveguide to the second optical waveguide, the connection optical waveguide including a resin core comprising a photo-curable resin, wherein a core diameter of the resin core gradually changes from a state adapted to the core diameter of the first optical waveguide to a state adapted to the core diameter of the second optical waveguide from a side facing the first optical waveguide to a side facing the second optical waveguide.

2. The optical connection structure according to claim 1, wherein:
a first end surface of the resin core facing the first optical waveguide and a first end surface of a core of the first optical waveguide abut each other; and
a second end surface of the resin core facing the second optical waveguide and a second end surface of a core of the second optical waveguide abut each other.

3. The optical connection structure according to claim 2, wherein:
the core diameter of a side of the resin core facing the first optical waveguide is substantially identical with a core system of the first optical waveguide; and
the core diameter of a side of the resin core facing the second optical waveguide is substantially identical with a core system of the second optical waveguide.

4. The optical connection structure according to claim 1, wherein a hole diameter of the insertion portion gradually decreases from each outer end of the insertion portion toward the spacer.

5. The optical connection structure according to claim 1, wherein the spacer is in a shape of a U or an arc.

6. A method of manufacturing an optical connection structure, the optical connection structure comprising a first optical waveguide, a second optical waveguide having a core diameter different from a core diameter of the first optical waveguide, and a connection optical waveguide disposed between an end surface of the first optical waveguide and an end surface of the second optical waveguide to optically connect the first optical waveguide to the second optical waveguide, the connection optical waveguide including a resin core comprising a photo-curable resin, wherein a core diameter of the resin core gradually changes from a state adapted to the core diameter of the first optical waveguide to a state adapted to the core diameter of the second optical waveguide from a side facing the first optical waveguide to a side facing the second optical waveguide, the method comprising:
disposing the first optical waveguide and the second optical waveguide such that the end surface of the first optical waveguide and the end surface of the second optical waveguide face each other and are separated by a predetermined interval, wherein the first optical waveguide and the second optical waveguide are secured by a holding member comprising an insertion portion into which the first optical waveguide and the second optical waveguide are inserted, and wherein a spacer comprising a film and disposed at a center of the insertion portion between the end surface of the first optical waveguide and the end surface of the second optical waveguide defines the predetermined interval between the end surface of the first optical waveguide and the end surface of the second optical waveguide;

after providing the spacer, disposing the photo-curable resin between the end surface of the first optical waveguide and the end surface of the second optical waveguide; and
forming the resin core by guiding a curing light that performs photo-curing of the photo-curable resin through each of the first optical waveguide and the second optical waveguide to perform, with the curing light, the photo-curing of the photo-curable resin disposed between the end surface of the first optical waveguide and the end surface of the second optical waveguide.

7. The method according to claim 6, further comprising:
after forming the resin core, removing the photo-curable resin that is uncured; and
after removing the photo-curable resin that is uncured, forming cladding where the resin core is to be embedded, between the end surface of the first optical waveguide and the end surface of the second optical waveguide.

8. The method according to claim 6, wherein forming the resin core comprises guiding a signal light with a wavelength that is not absorbed by the photo-curable resin that is uncured between the first optical waveguide and the second optical waveguide in addition to the curing light to perform the photo-curing of the photo-curable resin into a state where transmission intensity of the signal light is at a maximum level.

9. The method according to claim 6, wherein a hole diameter of the insertion portion gradually decreases from each outer end of the insertion portion toward the spacer.

10. The method according to claim 6, wherein the spacer is in a shape of a U or an arc.

11. A method of providing an optical connection structure, the method comprising:
providing a first optical waveguide and a second optical waveguide, wherein an end surface of the first optical waveguide is disposed to face an end surface of the second optical waveguide, and wherein the second optical waveguide has a core diameter different from a core diameter of the first optical waveguide;
providing a holding member for securing the first optical waveguide and the second optical waveguide, wherein the holding member comprises an insertion portion into which the first optical waveguide and the second optical waveguide are inserted;
providing a spacer comprising a film disposed at a center of the insertion portion between the end surface of the first optical waveguide and the end surface of the second optical waveguide to define an interval between the end surface of the first optical waveguide and the end surface of the second optical waveguide; and
after providing the spacer, disposing a connection optical waveguide between the end surface of the first optical waveguide and the end surface of the second optical waveguide to optically connect the first optical waveguide to the second optical waveguide, the connection optical waveguide including a resin core comprising a photo-curable resin, wherein a core diameter of the resin core gradually changes from a state adapted to the core diameter of the first optical waveguide to a state adapted to the core diameter of the second optical waveguide from a side facing the first optical waveguide to a side facing the second optical waveguide.

12. The method according to claim 11, wherein:
a first end surface of the resin core facing the first optical waveguide and a first end surface of a core of the first optical waveguide abut each other; and
a second end surface of the resin core facing the second optical waveguide and a second end surface of a core of the second optical waveguide abut each other.

13. The method according to claim 12, wherein:
the core diameter of a side of the resin core facing the first optical waveguide is substantially identical with a core system of the first optical waveguide; and
the core diameter of a side of the resin core facing the second optical waveguide is substantially identical with a core system of the second optical waveguide.

14. The method according to claim 11, wherein a hole diameter of the insertion portion gradually decreases from each outer end of the insertion portion toward the spacer.

15. The method according to claim 11, wherein the spacer is in a shape of a U or an arc.

* * * * *